(12) United States Patent
Ruiz (10) Patent No.: US 10,750,881 B1
(45) Date of Patent: Aug. 25, 2020

(54) PRODUCT DISPLAY AND MERCHANDIZING DEVICE, SYSTEM, AND METHOD

(71) Applicant: Fernando Ruiz, Queretaro (MX)

(72) Inventor: Fernando Ruiz, Queretaro (MX)

( * ) Notice: Subject to any disclaimer, the term of this patent is extended or adjusted under 35 U.S.C. 154(b) by 0 days.

(21) Appl. No.: 16/538,652

(22) Filed: Aug. 12, 2019

Related U.S. Application Data (60) Provisional application No. 62/865,911, filed on Jun. 24, 2019.

(51) Int. Cl.
| | | |
|---|---|---|
| *G07F 11/58* | (2006.01) | |
| *G07F 11/46* | (2006.01) | |
| *A47F 1/12* | (2006.01) | |
| *A47F 5/00* | (2006.01) | |
| *B65G 17/38* | (2006.01) | |
| *B65G 15/30* | (2006.01) | |

(52) U.S. Cl.
CPC ............ *A47F 1/12* (2013.01); *A47F 5/0006* (2013.01); *B65G 15/30* (2013.01); *B65G 17/38* (2013.01); *G07F 11/58* (2013.01); *B65G 2201/02* (2013.01)

(58) Field of Classification Search
CPC ......... A47F 1/12; A47F 5/0006; B65G 15/30; B65G 17/38; G07F 11/58; A47B 49/002; G11B 33/0483
See application file for complete search history.

(56) References Cited

U.S. PATENT DOCUMENTS

| | | | | |
|---|---|---|---|---|
| 887,282 | A | * 5/1908 | Smith et al. | A47F 3/08 211/121 |
| 1,861,282 | A | 5/1932 | Nelson | |
| 2,526,536 | A | * 10/1950 | Bryan | A47F 10/06 40/524 |
| 2,815,864 | A | 12/1957 | Alexander | |
| 3,288,271 | A | * 11/1966 | Burford | B65G 17/326 198/803.11 |
| 3,314,177 | A | * 4/1967 | Mies, Jr. | B42F 17/08 40/124 |

(Continued)

FOREIGN PATENT DOCUMENTS

| | | |
|---|---|---|
| MX | 3759 B | 11/2017 |
| WO | 2017/021456 A1 | 2/2017 |

*Primary Examiner* — Kimberley S Wright
(74) *Attorney, Agent, or Firm* — Foley & Lardner LLP (57) ABSTRACT

This disclosure presents a product display and merchandising device, system and method that may include multiple such product displays and merchandising devices, and a method for dispensing products to customers using such product display and merchandising device. The merchandising system may efficiently utilize storage space and provide an aesthetic display by automatically aligning different products to a front display surface. The merchandising system may use multiple holders or clips on a conveyor belt to hang and display products. A customer may pull and remove a front piece of the products. As the customer pulls the front piece of merchandise or product, the action moves the conveyor belt and brings a next piece of products forward, to the position that the front piece of the product previously occupied. As such, the merchandising system may enable customers to freely remove products and maintain a tidy and neat display of the products.

25 Claims, 10 Drawing Sheets

(56) References Cited

U.S. PATENT DOCUMENTS

| | | | | |
|---|---|---|---|---|
| 3,756,455 A * | 9/1973 | Patrick | B65G 17/20 | 221/85 |
| 3,757,993 A * | 9/1973 | Bruckner | G07F 11/58 | 221/80 |
| 3,765,566 A * | 10/1973 | Dasher | G07F 11/58 | 221/129 |
| 3,770,105 A | 11/1973 | O'Neal | | |
| 3,780,909 A * | 12/1973 | Callahan | G07F 11/58 | 221/85 |
| 3,783,994 A * | 1/1974 | Tomalty | A47F 10/06 | 198/803.8 |
| 3,814,282 A * | 6/1974 | Stoltz | G07F 11/58 | 221/85 |
| 4,742,924 A * | 5/1988 | Tarlow | B65G 37/005 | 211/121 |
| 5,255,773 A * | 10/1993 | Pollock | B65G 47/5154 | 198/347.3 |
| 5,366,063 A * | 11/1994 | Pollock | B65G 47/5154 | 198/347.3 |
| 5,533,632 A * | 7/1996 | Patterson | A47F 5/025 | 198/678.1 |
| 5,577,595 A * | 11/1996 | Pollock | B65G 47/5154 | 198/347.3 |
| 5,645,173 A * | 7/1997 | Taylor | A47G 25/74 | 211/1.3 |
| 5,711,431 A * | 1/1998 | Reichert | A47F 5/0884 | 211/122 |
| 5,836,675 A * | 11/1998 | Woodring | A47G 25/746 | 362/234 |
| 6,234,300 B1 | 5/2001 | De Vos et al. | | |
| 6,439,423 B1 * | 8/2002 | Suzuki | G07F 11/58 | 221/81 |
| 6,543,628 B1 * | 4/2003 | Kao | G11B 33/0483 | 206/308.1 |
| 6,598,732 B2 | 7/2003 | Guindulain Vidondo | | |
| 6,698,854 B1 * | 3/2004 | Knox, Jr. | A47G 29/10 | 211/1.56 |
| 6,955,267 B2 * | 10/2005 | Taylor | G11B 33/0483 | 206/308.2 |
| 7,798,335 B2 * | 9/2010 | McKinney, Jr. | A47G 25/746 | 211/1.51 |
| 7,819,281 B2 | 10/2010 | Guindulain Busto | | |
| 9,443,372 B2 * | 9/2016 | Mockus | G07F 11/00 | |
| 10,034,561 B2 * | 7/2018 | Horton | A47F 10/06 | |
| 10,093,490 B2 | 10/2018 | Benedetti | | |
| 2003/0226813 A1 * | 12/2003 | Taylor | G11B 33/0483 | 211/40 |
| 2003/0226814 A1 * | 12/2003 | Taylor | G11B 33/0483 | 211/40 |
| 2005/0114216 A1 * | 5/2005 | Lantz | A47F 9/045 | 705/16 |
| 2019/0029444 A1 | 1/2019 | Valiulis et al. | | |
| 2019/0125101 A1 * | 5/2019 | Pozzi | A47F 5/005 | |
| 2019/0164379 A1 | 5/2019 | Chang et al. | | |

* cited by examiner

PRODUCT DISPLAY AND MERCHANDIZING DEVICE, SYSTEM, AND METHOD

CROSS REFERENCE AND PRIORITY CLAIM TO PROVISIONAL APPLICATION

This application claims the benefits and priority of the U.S. Provisional Patent Application No. 62/865,911 filed on Jun. 24, 2019, the entire contents of which are incorporated herein by reference for all purposes.

FIELD

This disclosure relates in general to merchandising systems.

BACKGROUND

Conventional merchandising systems do not optimally utilize space. For example, shelf displays often have heights for each shelf much greater than the height needed by the product. As such, space above the product is not economically utilized Further, some merchandising systems, such as those that hang products, are often unable to automatically bring products hanging in the back to the front. This affects the overall aesthetics due to unevenness in the front and creates difficulty for customers to access products hanging in the back.

Even for some merchandising systems that have spring-loaded pushers in the back of the shelf to automatically bring the next available product up front, reloading such merchandising system would be difficult because the loading force required to place the products increases as the spring compresses. Furthermore, the spring compression may cause more than one product to be pulled out at once when a customer attempts to remove the front product.

Therefore, conventional merchandising systems are not utilizing space efficiently, lacking automatic self-organization abilities, and include various difficulties in reloading or dispensing products to customers.

SUMMARY

This disclosure presents a product display and merchandising device, system, and method, including multiple such product displays and merchandising devices, and a method for dispensing products to customers using such product display and merchandising device. The disclosed display and device may efficiently utilize storage space and provide an aesthetic display by aligning different products to a front display surface. In one embodiment, the merchandising system uses multiple clips on a conveyor belt to hang products for display and storage. A customer may pull and remove a front piece of the products. As the customer pulls the front piece of products, the action moves the conveyor belt or mechanism to bring a next piece of products or merchandise forward, to the position that the front piece of the products previously occupied. As such, the merchandising system may enable customers to freely remove products and maintain a tidy and neat display of the products.

The disclosed merchandising system may include other features in other embodiments. For example, the merchandising system may be easy to assemble with replaceable parts. The overall merchandising system may be customizable in certain embodiments, for different product sizes as well as for different storage volumes and front face areas. This may be achieved by varying the length of each unit, placing different number of units side by side, and installing different number of rows of racks for mounting the units. Because the dispensing action does not rely on electricity in certain embodiments to move the merchandise, the merchandising system may operate without external power. In some embodiments, the merchandising system may be equipped with counters (either mechanical or electrical) to indicate the number of products that remain or that have been removed. This provides instant data for inventory management and timely prompts the need to restock products to the merchandising system. Other features and embodiments are further described in the detailed description below.

In a first general aspect, a device disclosed herein is configured to display and store merchandise. The device includes a conveyor belt, two or more holders positioned adjacent the conveyor belt, and a front roller adjacent a front end of the device. The front roller is in a rotational coupling arrangement with the conveyor belt such that the conveyor belt is at least partially supported by and wraps around at least a portion of the front roller. The device further includes a back roller in a rotational coupling arrangement with the conveyor belt such that the conveyor belt is at least partially supported by and wraps around at least a portion of the back roller. The device may also include a frame arranged to provide, for example, a distance between the front roller and the back roller. In some embodiments, the two or more holders positioned adjacent the conveyor belt move when the conveyor belt moves with the front roller and the back roller. In some embodiments, movement of one of the two or more holders in a first direction causes the conveyor belt to move with the front roller and the back roller to move the two or more holders.

In one specific aspect, the conveyor belt may include a number of inward facing protrusions, such as teeth, and the front roller includes a gear or tooth having outward facing teeth engageable with inward facing protrusions of the conveyor belt. In some embodiments, the conveyor belt may include a number of holes to receive and engage with the outward facing teeth of the gear of the front roller.

In another specific aspect, the back roller may include another gear having teeth engageable with the protrusions of the conveyor belt such that the front roller and the back roller provide a tension to the conveyor belt to reduce the conveyor belt slack.

In yet another specific aspect, the number of inward facing protrusions of the conveyor belt may include receiving holes for receiving and securing the two or more holders therein. In some embodiments, the receiving holes are positioned at the inward facing protrusions. In some instances, the receiving holes have a square profile such that the two or more holders are secured to the conveyor belt in one specific orientation, such as being perpendicular to the conveyor belt.

In another specific aspect, the frame may include a first half and a second half. The first half may include a first axis support to receive the front roller, a second axis support to receive the back roller, a guide rail for guiding the two or more holders, and a hanger for hanging the frame onto an external member. In some embodiments, the hanger may include a channel, such as a channeled ceiling including a channel therein. The channel may be insertable onto the external member which includes a rod portion.

In yet another specific aspect, the device may further include a sensor for measuring a movement of the two or more holders. The movement may be indicative of a number of the two or more holders moved from a bottom side of the conveyor belt to a different location of the conveyor belt.

In one specific aspect, the two or more holders may include one or more of a clip, a hook, a hanger, a magnetic surface, a horseshoe shaped support, clasp, angled bar, an open clip arranged to be placed in an open position when a stored merchandise is removed from the open clip, or an adhesive surface, or two or more combinations thereof.

In another specific aspect, the two or more holders may be removably affixed onto the conveyor belt.

In yet another specific aspect, the conveyor belt may include a number of square holes and the two or more holders include corresponding handles insertable into the square holes. In some embodiments, the corresponding handles of the two or more holders are hinged and configured to allow the two or more holders to rotate relative to the conveyor belt.

In one specific aspect, one or more of the front roller and the back roller is a sprocket or gear.

In another specific aspect, the conveyor belt is a chain.

In yet another specific aspect, the conveyor belt may move in the first direction and in a second direction. The second direction may be opposite to the first direction. In some embodiments, when viewed from one side, the first direction may be a clockwise direction and the second direction may be a counterclockwise direction.

In another general aspect, a method is disclosed herein to display and dispense merchandise. The method may include securing a number of pieces of merchandise to a number of holders secured to a conveyor belt. A pulling force is received at a first piece of merchandise that is secured to a first holder secured to a conveyor belt. The first holder secured to the conveyor belt is moved upwards in response to receiving the pulling force. The first piece of merchandise is released in response to a sufficient amount of pulling force. In response to the pulling force, a second holder positioned behind the first holder secured to the conveyor belt is moved to a position closer to the front, such as where, or near where, the first holder was previously positioned. The second holder secures a second piece of merchandise or product.

In one specific aspect, the method may further include receiving a second pulling force at the second piece of merchandise secured to the second holder secured to the conveyor belt. The second holder secured to the conveyor belt is moved upwards in response to receiving the second pulling force. The second piece of merchandise is released in response to the second pulling force. The first holder (now emptied and positioned before the second holder) is moved behind an information display in response to the movement of the conveyor belt caused by the second pulling force. A third holder positioned behind the second holder is also moved to a position where or near where the second holder was previously positioned. The third holder may secure a third piece of merchandise that is the same or different from the other pieces of merchandise.

In another specific aspect, the method further includes counting a number of emptied holders secured to the conveyor belt for inventory purposes.

In yet another specific aspect, the method further includes counting a number of holders secured to the conveyor belt that still contain merchandise for inventory purposes.

In one specific aspect, releasing a front piece of the merchandise further comprises moving a next piece to a position occupied by the front piece before receiving the pulling force at the next piece of the merchandise as a result of a rotation of the conveyor belt. For example, when a front piece of the merchandise is pulled away from its holder, the method includes using a motorized conveyor belt (or mechanically biased or leveraged conveyor belt, such as spring biased or driven conveyor belt) to move the next piece of the merchandise to the previous position of the front piece of the merchandise before pulled away.

In another specific aspect, the method further includes counting a number of holders having released a piece of the merchandise and reporting the number to an accounting processor for accounting.

In yet another specific aspect, the method may include counting the number of holders having released a piece of the plurality pieces of the merchandise includes counting a number of emptied holders moved behind the information display.

In yet another specific aspect, the method further includes displaying a digital image or video clip at the information display. For example, the information display may include electronic displays, such as LCD panels, for updating and showing pre-programmed product information. In some embodiments, the information display may be connected to an internet server and receive updated information on what digital image or video clip to display.

In another general aspect, a system is disclosed herein for displaying and storing merchandise. The system may include one or more racks structured and arranged to mount one or more merchandise display devices. The one or more merchandise display devices include a conveyor belt, and one or more holders positioned adjacent the conveyor belt. In some embodiments, the one or more holders are configured to engage a piece of merchandise. The one or more merchandise display devices further include a front roller adjacent a front end of the device and in a rotational coupling arrangement with the conveyor belt such that the conveyor belt is at least partially supported by and wraps at least partially around the front roller, and a back roller in a rotational coupling arrangement with the conveyor belt such that the conveyor belt is at least partially supported by and wraps at least partially around the back roller. The one or more merchandise display devices further include a frame arranged to provide a distance between the front roller and the back roller. In some embodiments, the one or more holders positioned adjacent the conveyor belt move when the conveyor belt moves with the front roller and the back roller. In some embodiments, movement of any of the one or more holders in a first direction causes the conveyor belt to move with the front roller and the back roller to move all the one or more holders. The system further includes one or more information displays positioned adjacent the front end of at least one of the one or more merchandise display devices.

In one specific aspect, a holder of the one or more holders may release the piece of merchandise being held by the holder when the piece of merchandise receives a pulling force away from the holder.

In another specific aspect, an emptied one of the one or more holders positioned before a loaded one of the one or more holders holding a piece of merchandise is moved behind the one or more information displays when the loaded one of the one or more holders receives a pulling force towards the one or more information displays, and releases the piece of merchandise.

In yet another specific aspect, the one or more holders have a full length and are hinged and configured to allow the one or more holders to rotate relative to the conveyor belt such that a clearance height for holders moved behind the one or more information displays is less than the full length of one of the one or more holders.

In one specific aspect, the frame is arranged to allow one or more of the front roller and the back roller to be space apart at different distances for use with conveyor belts of different lengths, such that a different number of holders may be installed on the conveyor belts of different lengths.

In another specific aspect, the one or more merchandise display devices further includes a hanger bracket for engaging the one or more racks, the hanger bracket including a slot having an opening less than a diameter of a metal bar of the one or more racks, the slot receiving the metal bar by a friction fitting.

In yet another specific aspect, the conveyor belt has a number of inward facing teeth for engaging a number of outward facing teeth of the front roller and the rear roller. Other aspects, features, and advantages will become apparent from the following detailed description when taken in conjunction with the accompanying drawings, which are a part of this disclosure and which illustrate, by way of example, principles of certain embodiments of the inventions hereof.

DESCRIPTION OF THE FIGURES

The accompanying drawings facilitate an understanding of the various embodiments.

Like numerals refer to like elements.

DETAILED DESCRIPTION

This disclosure presents a merchandising system including one or more product display and dispensing devices (hereinafter "merchandise display devices"). At a high level, the merchandising system can be configured for different product sizes and storage spaces, and efficiently utilizing available spaces. The merchandise display devices illustrated include multiple holders attached to or linked to a conveyor belt. The holders may be permanently or removably attached or secured to the conveyor belt. A customer may pull and drag a front piece of the loaded products or merchandise of the multiple holders. The movement of the front piece causes the whole conveyor belt to move all the holders and the products/merchandise attached thereon. In this manner, the next product in line can be brought to the front position in which the previous piece of product occupied. And any emptied previous holders can be retracted behind an information display positioned to cover at least a portion of the front of the merchandise display device. The following detailed description will first explain the configuration of one embodiment or implementation of the merchandise display device and then present the overall merchandising system, which may include two or more merchandise display devices, and related methods.

Figure 1:
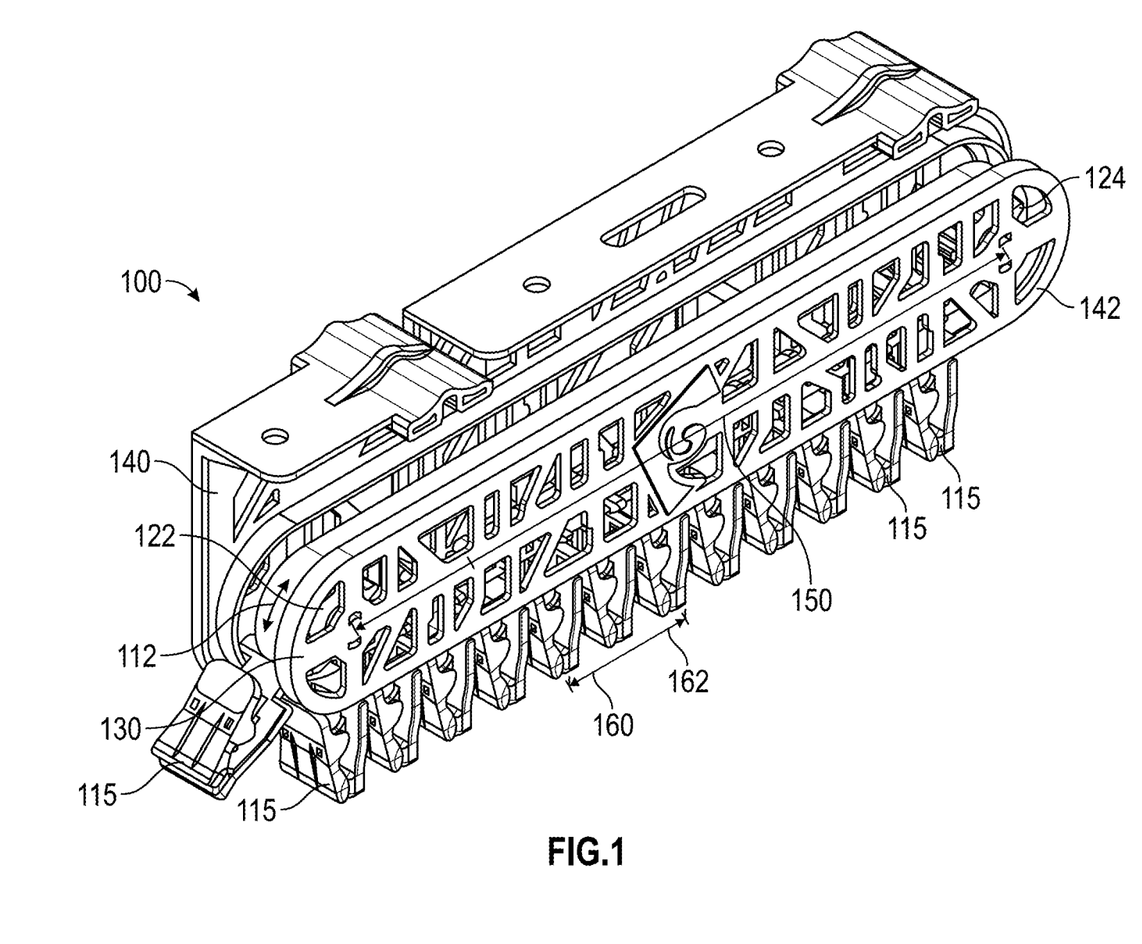
FIG. 1 is a first perspective view of an example of one embodiment of a merchandise display device.

FIG. 1 is a first perspective view of an example of one embodiment of a merchandise display device 100. The merchandise display device 100 includes a conveyor belt 112, and multiple holders 115 positioned adjacent or on the conveyor belt 112. In the illustrated embodiment, the holders 115 are spring-loaded clips for securing merchandise under the conveyor belt 112. The holders 115 may engage one or more pieces of products, goods, commodities, or merchandise, for example, by clamping onto its package or container. In some embodiments, each holder 115 provides sufficient support to balance the weight of each piece of merchandise engaged, while allowing a customer to pull and overcome a maximum support force provided by the holder 115 to remove the piece of merchandise from the holder 115. Specifically, in certain implementations, the holders 115 do not rely on another external structure, such as a separate metal rail or bar, for supporting the weight of the merchandise. Such configuration allows for moving a number of products or merchandise in a horizontal direction using the holders 115 with little or limited friction resistance in the horizontal direction. Furthermore, the holders 115 would not, in certain embodiments, experience constant bending deformation that would stress the conveyor belt 112 because each product freely hangs under the holder 115. Although the holders 115 are illustrated as clips, other mechanisms may be used, such as magnetic connectors, hooks, among others.

As shown, the merchandise display device 100 includes a front roller 122 and a back roller 124. The front roller 122 is adjacent a front end 130 of the merchandise display device 100. The front roller 122 is in a rotational coupling arrangement with the conveyor belt 112 such that the conveyor belt 112 is at least partially supported and wraps at least partially around the front roller 122.

Similarly, the back roller 124 is in a rotational coupling arrangement with conveyor belt 112 such that the conveyor belt 112 is at least partially supported by and wraps at least partially around the back roller 124. The merchandise display device 100 further includes a frame/cover 142 that provides a distance 150 between the front roller 122 in the back roller 124. In the illustrated embodiment, the frame 140 includes a cover 142 to enclose the conveyor belt 112 and the multiple holders 115. During operation, the holders 115 positioned adjacent the conveyor belt 112 move together when the conveyor belt 112 moves with the first roller 122 and the back roller 124. For example, movement of one of the holders 115 in a first direction 160 can cause the conveyor belt 112 to move with the front roller 122 and the back roller 124 to move all the holders 115. The conveyor belt 112 and the holders 115 can move in the first direction 160 when dispensing products and, in certain implementations, in an opposite direction 162 when loading products.

In some embodiments, the holders 115 can include a clip as shown, and other types of holders not shown in FIG. 1: a hook, a hanger, a magnetic surface, a horseshoe shaped support, a clasp, an angled bar, an open clip arranged to be placed in an open position when a stored merchandise is removed from the open clip, or an adhesive surface, or two or more combinations thereof. For example, the type and shape of the holders 115 may depend on the specific products to be displayed and stored. Further, in certain embodiments, different types of holders 115 may be used on the same merchandise display device 100.

When the products are bags of chips, pastries, baked goods, candy bars, pre-packaged food items, or the like, the holders 115 may be clips as shown in FIG. 1. When the products are cans of drinks or the like, the holders 115 may take on a shape of a horseshoe shaped support to engage a neck portion of the products. In such cases, the horseshoe shaped support may be elastic and deformed to release the product when sufficient pulling forces are applied. In some other embodiments, the holders 115 may be electrically actuated, such as controlled by a processor to actively release an engagement mechanism when sufficient pulling forces have been applied. The holders 115 may be opened and closed altogether for easy loading, such as by being able to be set in an open position as open clips. In some other embodiments, the holder 115 may have a magnetic surface or an adhesive surface for holding onto the displayed products, and release the products when the pulling force overcomes the magnetic force or adhesive force with the holders 115.

Figure 2:
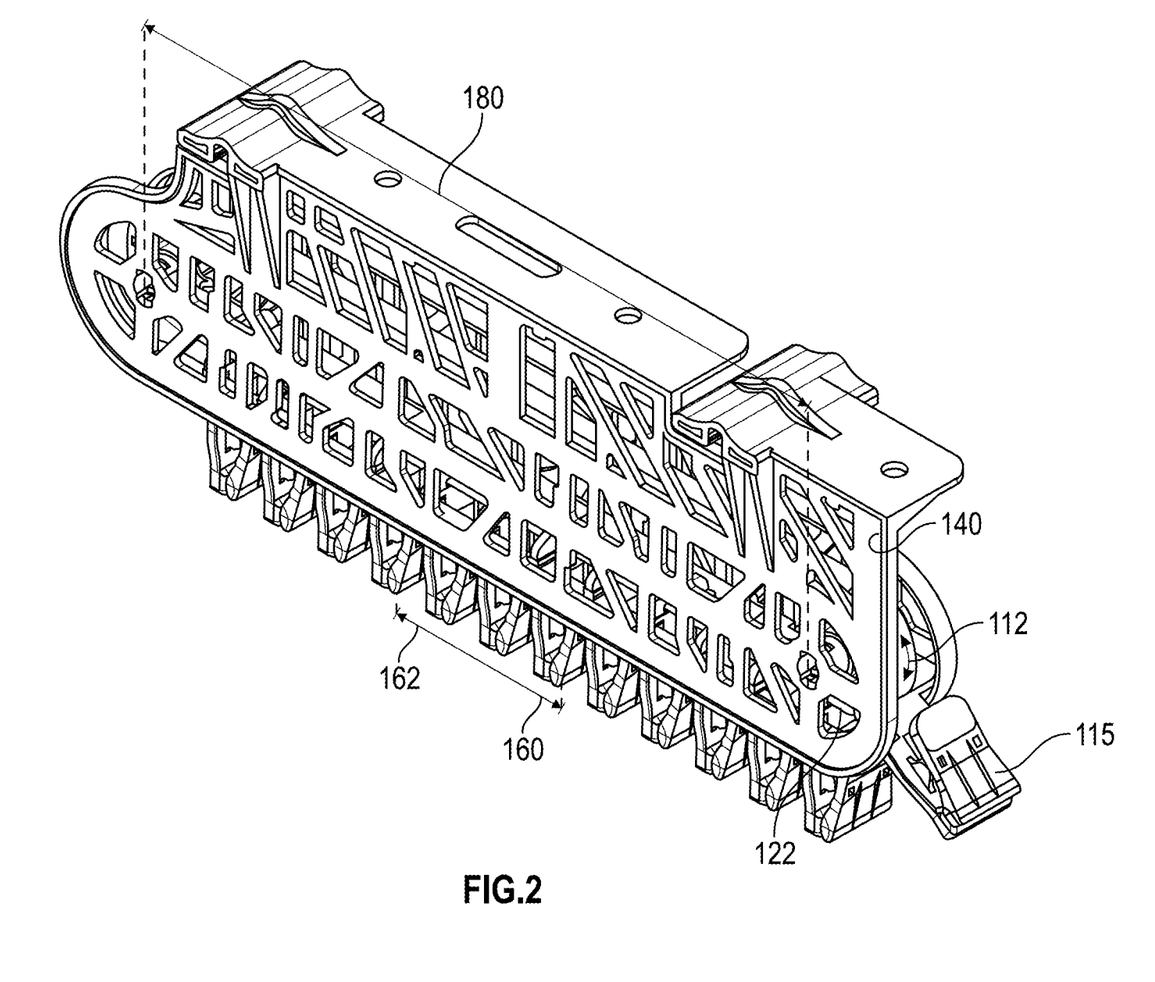
FIG. 2 is a second perspective view of the merchandise display device of FIG. 1.
Figure 3:
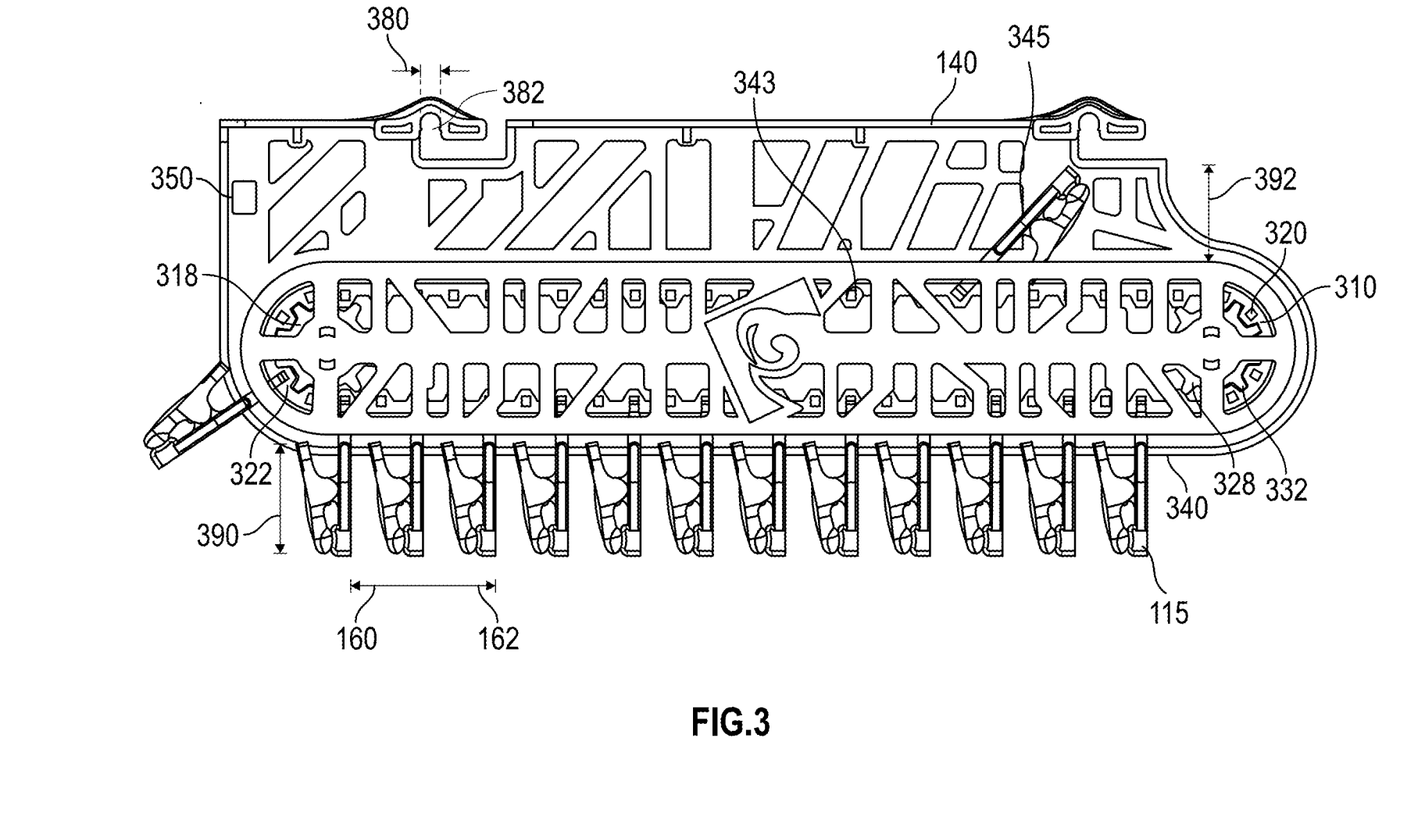
FIG. 3 is a side view of the merchandise display device of FIG. 1.

Turning now to FIGS. 2-3, FIG. 2 is a second perspective view of the merchandise display device 100 of FIG. 1 from a different angle, further illustrating the support provided by the frame 140. FIG. 3 is a side view of the merchandise display device 100 of FIG. 1. As shown, the conveyor belt 112 includes, in this embodiment, a number of inward facing protrusions 310. The front roller 122 includes a gear 318 that has outward facing teeth 322 engageable with the number of inward facing protrusions 310 of the conveyor belt 112. In some embodiments, the back roller 124 includes another gear 328, which has outward facing teeth 332 engageable with various of the inward facing protrusions 310 of the conveyor belt 112, such that the front roller 122 and the back roller 124 provide tension to the conveyor belt 112 to reduce the slack of the conveyor belt 112. In other embodiments the front roller 122 and the back roller 124 may engage with the conveyor belt 112 using any known or available arrangement.

In some embodiments as shown in FIG. 3, the number of inward facing protrusions 310 of the conveyor belt 112 may include receiving holes 320 for receiving and securing the holders 115. The merchandise display device 100 may further include a sensor 350 measuring a movement of the holders 115. As shown, the sensor 350 is installed in or adjacent the frame 140 and may be triggered every time a holder 115 passes by. For example the sensor 350 may be a light sensor, a Halls sensor, a capacitor, or such sensor that outputs a signal based on proximity readings. The movement of the holders 115 is indicative of a number of holders 115 moved from a bottom side 340 of the conveyor belt 112 to a different location of the conveyor belt 112.

In some implementations, the conveyor belt 112 may be a chain or similar structure. Correspondingly, the front roller 122 may be a sprocket. The back roller 124 may also be a sprocket. However, in some cases, the back roller 124 may be a roller without any teeth for tensioning purpose. In some other implementations, the conveyor belt 112 may include openings for receiving the teeth of the front roller 122 or the back roller 124 when they include gears or sprockets.

In some embodiments, the holders 115 have a full length 390 and are hinged at a rotatable end, such as the hinge 343, assuming a holder 115 is hingably mounted therein. The hinge 343 is configured to allow the holders 115, such as the holder 345 as shown, to rotate relative to the conveyor belt 112. This allows a holder 115 to angle down, such as shown by the position of holder 345 of FIG. 3, when a holder 115 is not holding product or merchandise and is rotated above the underside holders 115 that are positioned below to hold product or merchandise. This angle down orientation provides for a smaller clearance height to be used for holders 115 as they rotate from the underside to above when they no longer hold product or merchandise. This can be seen by the shorter clearance height 392 for the empty holder 345 positioned along the top of the conveyor 112 when compared to the to the clearance height 390 of the holders 115 positioned on the underside and hanging below the bottom 340.

In some embodiments, such as for space saving reasons, the clearance height 390 may be the same distance between a bottom surface of the frame 140 and the upper edge of cover 142, though the currently illustrated frame 140 provides an additional clearance on top of the clearance height 390. In some embodiments, information displays are used to cover the emptied holders hidden or retracted behind the information display, such as the information display 800 in FIG. 8. In other embodiments, the holder 345 would not angle down if the holder 345 was non-hingably attached to the conveyor 112. In such a case, additional clearance may be needed above the conveyor to allow the holders to strand vertically.

The frame 140 may include two or more engagement openings 382 (which may be referred to as channels of a hanger) for securing the merchandise display device 100 to external structures, such as rods or members of a shelf rack or frame. The opening 382 may have a width 384 that is smaller than a diameter of the external structure to form a desired secure or tight fit.

Figure 4:
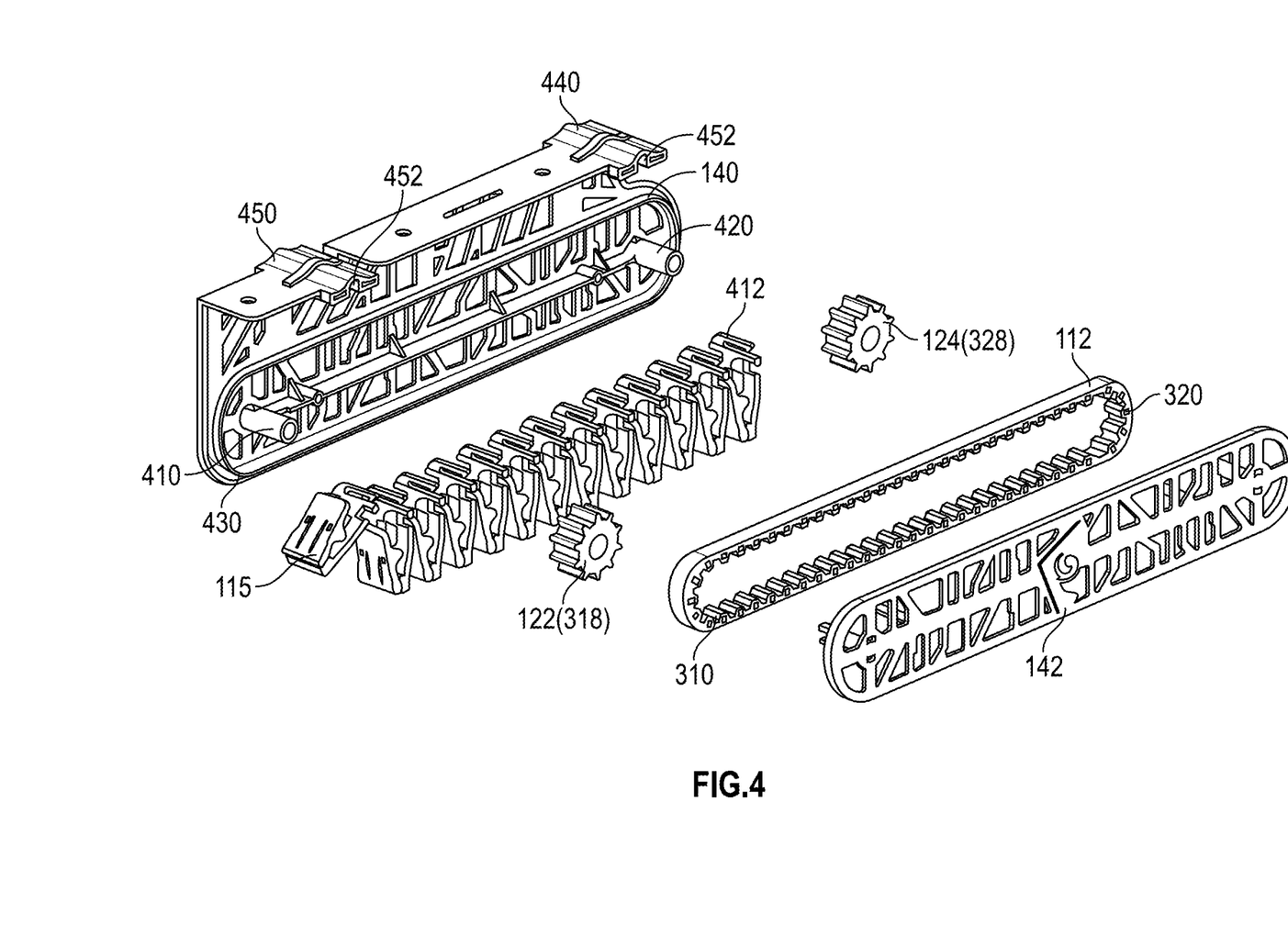
FIG. 4 is an exploded view of the merchandise display device of FIG. 1.

FIG. 4 is an exploded view of an embodiment of the merchandise display device 100 of FIG. 1 and illustrates various major components of the merchandise display device 100 in detail. Turning to the frame 140, the frame 140 includes a front or first axis support 410 and a back or second axis support 420 to respectively receive the front roller 122 and the back roller 124. The frame 140 may include a first half (i.e., itself) and a second half (i.e., the cover 142). The frame 140 may include a guide rail 430 to assist with guiding the holders 115. The frame 140 also includes a front hanger 450 and a back hanger 440 for securing the frame onto an external member via a channel or a slot 452. The external member may be a rod, a wire, a platform, a member, or the like. The slot 452 may be adapted to mate with virtually any available or needed external member to secure and to prevent the merchandise display device 100 from moving back and forth relative to the external member. The slot 452 may also enable the merchandise display device 100 to slide laterally along the external member, such as to adjust the horizontal position of the merchandise display device when multiple such devices are installed side by side on the external member.

The front roller 122 is rotatably mounted onto the axis support 410 of the frame 140. The back roller 124 is rotatably mounted onto the axis support 420 of the frame 140. In the embodiment as shown, the front roller 122 and the back roller 124 can freely rotate around the respective axis supports 410 and 420. In other embodiments, however, the axis support 410 and 420 may be motorized and actively rotate the front roller 122, the back roller 124, or both. In the illustrated example, the front roller 122 and the back roller 124 are gears 318 and 328 having teeth 322 and 332 as indicated in FIG. 3. In other embodiments, the front roller 122 and the back roller 124 may be a sprocket, a wheel, or the like, and may include or use bearings to assist with rotation as desired.

As shown, the holders 115 are illustrated in this embodiment in the form of clips having spring loaded halves biased toward a closed position at a tip. Merchandise may be fastened onto the clips by friction. In other embodiments, the holders 115 may take on a different form, such as in the form of hooks, clasps, hangers, or the like. The holders 115 are configured or arranged to withstand the gravitational forces of the products to be displayed and stored, and to release the products when sufficient pulling force applied by a customer is received. For example, the holders 115 may include a magnetic or adhesive surface to hang products underneath.

The holders 115 may have a hinge member or handle 412 for each of the holders 115 to be inserted into the holes 320 of the conveyor belt 112. In the example shown, the holes 320 have a square cross section profile and are positioned in each tooth 310 of the conveyer belt 112. The square profile of the holes 320 in this embodiment allows the conveyor belt 112 to support the front piece of emptied holder 115 to angle forward and upward to avoid impeding access to the next holder 115. Furthermore, the front piece of the holder 115, when angled forward and upward by the conveyor belt 112, can be easily manipulated to reload products or merchandise when a user loads the conveyor belt 112 in the direction 162. The holders 115, in some embodiments, may be hingably and removably affixed to the conveyor belt 112, such as, for example, by friction when the holders 115 are inserted into the conveyor belt 112. When a customer pulls on a product positioned in the front, the front holder 115 is pulled toward the customer until the pulling force no long moves the conveyor belt 112 and/or the next product is now positioned as the front product. This product dispensing configuration is further shown in FIG. 10. In some embodiments, the handles 412 of the holders 115 may be hinged and configured to allow the holders 115 to rotate relative to the conveyor belt 112.

Figure 5:
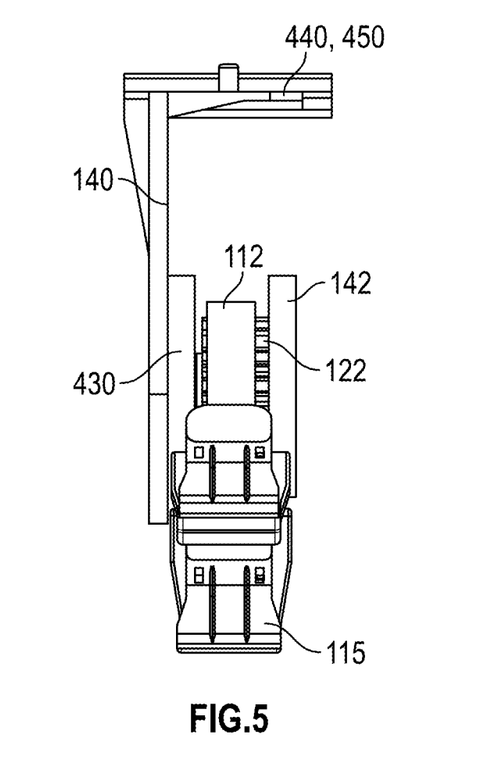
FIG. 5 is a front view of the merchandise display device of FIG. 1.

FIG. 5 is a front view of the merchandise display device 100 of FIG. 1. Viewed together with FIG. 4, the hanger 440 of the frame 140 forms a channeled ceiling 450 that provides sufficient space above the conveyor belt 112 for receiving or retracing emptied holders 115. The ceiling 450 includes a channel 452 that is insertable onto a rod portion (such as the rod portion 712 shown in FIG. 7) of an external member (such as the rack 710).

Figure 6:
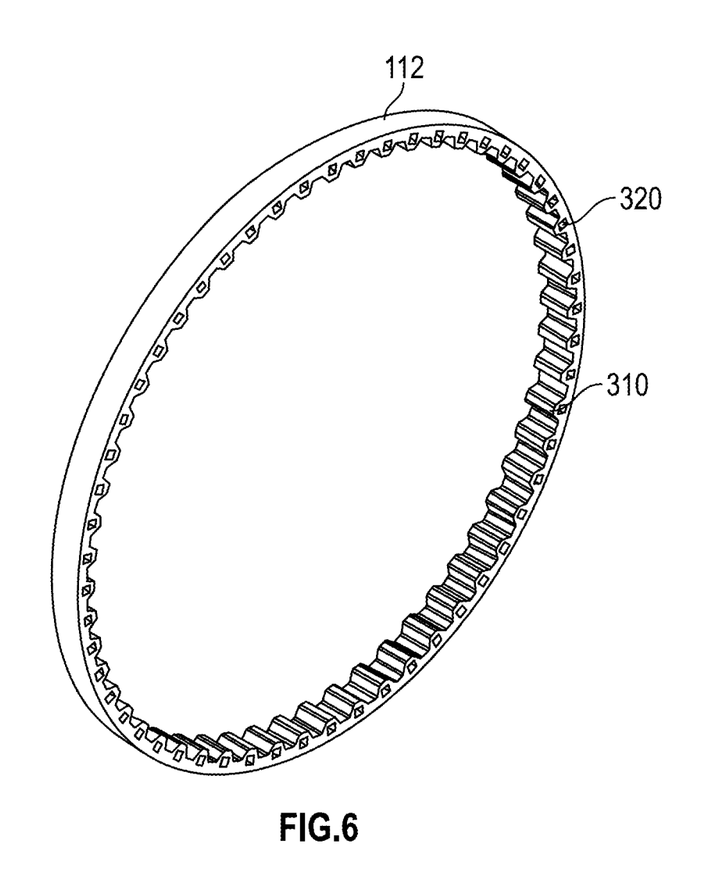
FIG. 6 is a perspective view of the conveyor belt configured or structured to be used or arranged in the merchandise display device of FIG. 1.

FIG. 6 is a perspective view of the conveyor belt 112 configured or structured to be used or arranged in the merchandise display device 100 of FIG. 1.

In the present example, the conveyor belt 112 may be made of rubber, elastic polymer, polypropylene, thermoplastic, or any suitable material that allows rotation. In certain embodiments, the conveyor belt 112 elastically deforms, if desired, without losing structural integrity.

Figure 7:
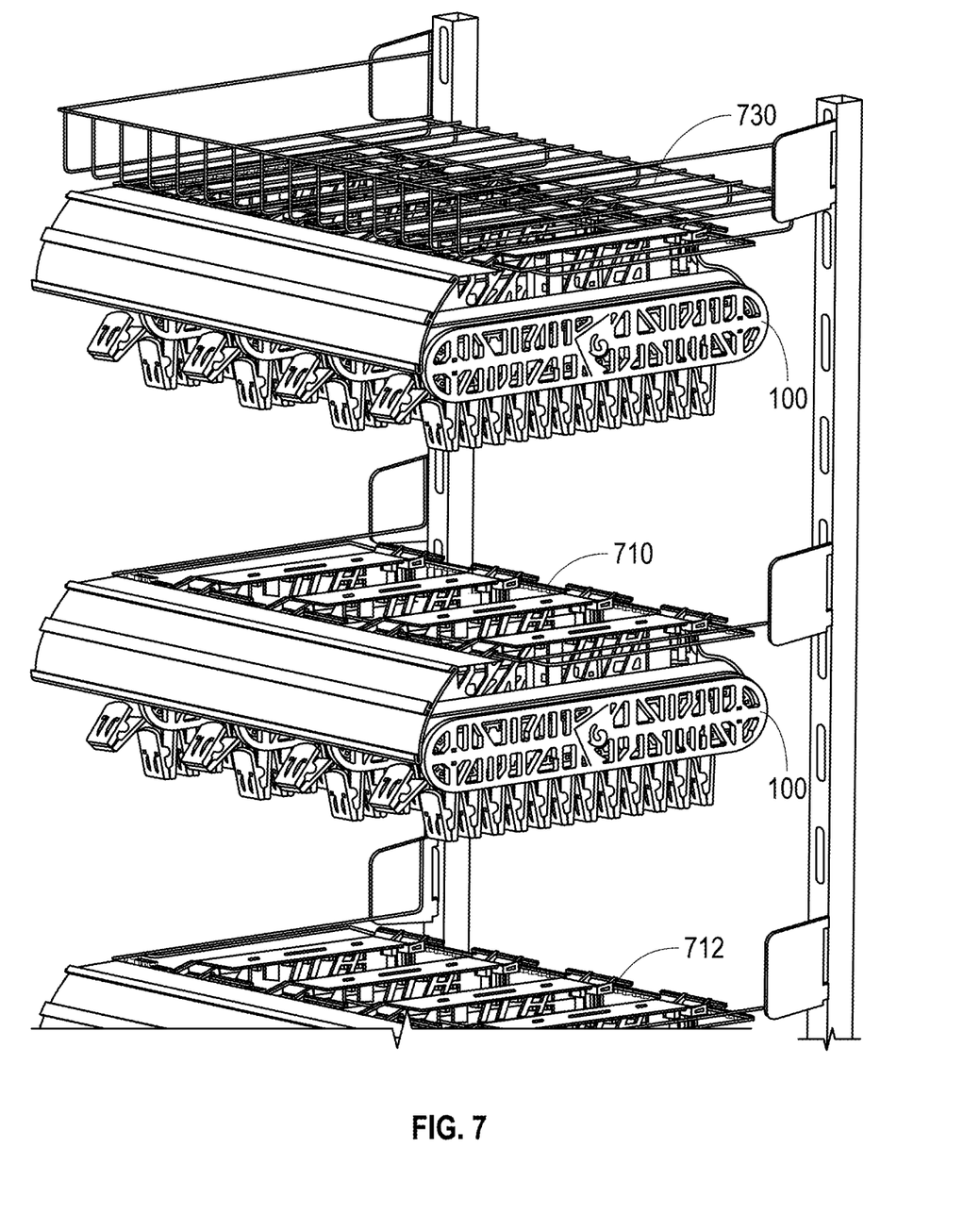
FIG. 7 is a perspective view of multiple merchandise display devices of the embodiment of FIG. 1 adjacent one another and installed in multiple racks or levels without products loaded thereon.

FIG. 7 is a perspective view of multiple merchandise display devices 100 installed in multiple racks 710 without products loaded thereon. As shown the racks 710 include two or more bar members to receive the channels 452 of the hangers 440 of the frames 140. The racks 710 may include a top shelf or top rack 730 that includes side support for containing products in a basket configuration. A merchandise loaded example is provided in FIG. 8.

Figure 8:
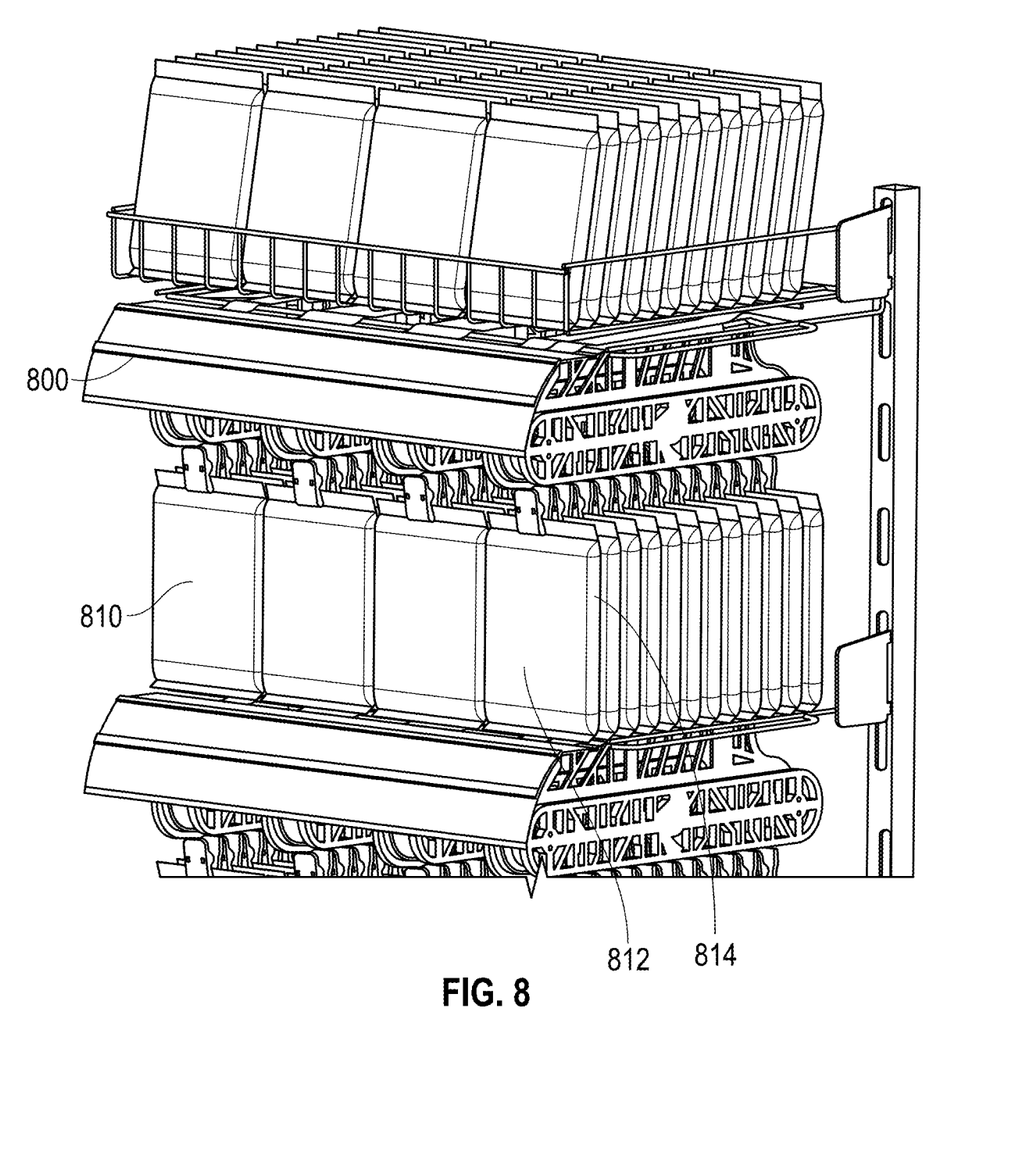
FIG. 8 is a perspective view of the multiple merchandise display devices of FIG. 7 with sample products loaded thereon.

FIG. 8 is a perspective view of the multiple merchandise display devices 100 of FIG. 7 positioned side by side with products loaded thereon. As shown, one or more information displays 800 may be positioned adjacent the front end 130 of the merchandise display devices 100. The one or more information displays 800 may be one piece across multiple merchandise display devices 100 or may include separate or multiple information displays 800. In other embodiments, however, each of the merchandise display devices 100 may include its own information display 800. In some embodiments, the information display 800 may be an electronic display, such as an LCD to show moving advertisements as well as prices, brands, and specifics about the products being displayed. The information display 800 may be mounted directly onto the frames 140 of the merchandise display devices 100, or may be mounted onto the racks 710.

Figure 10:
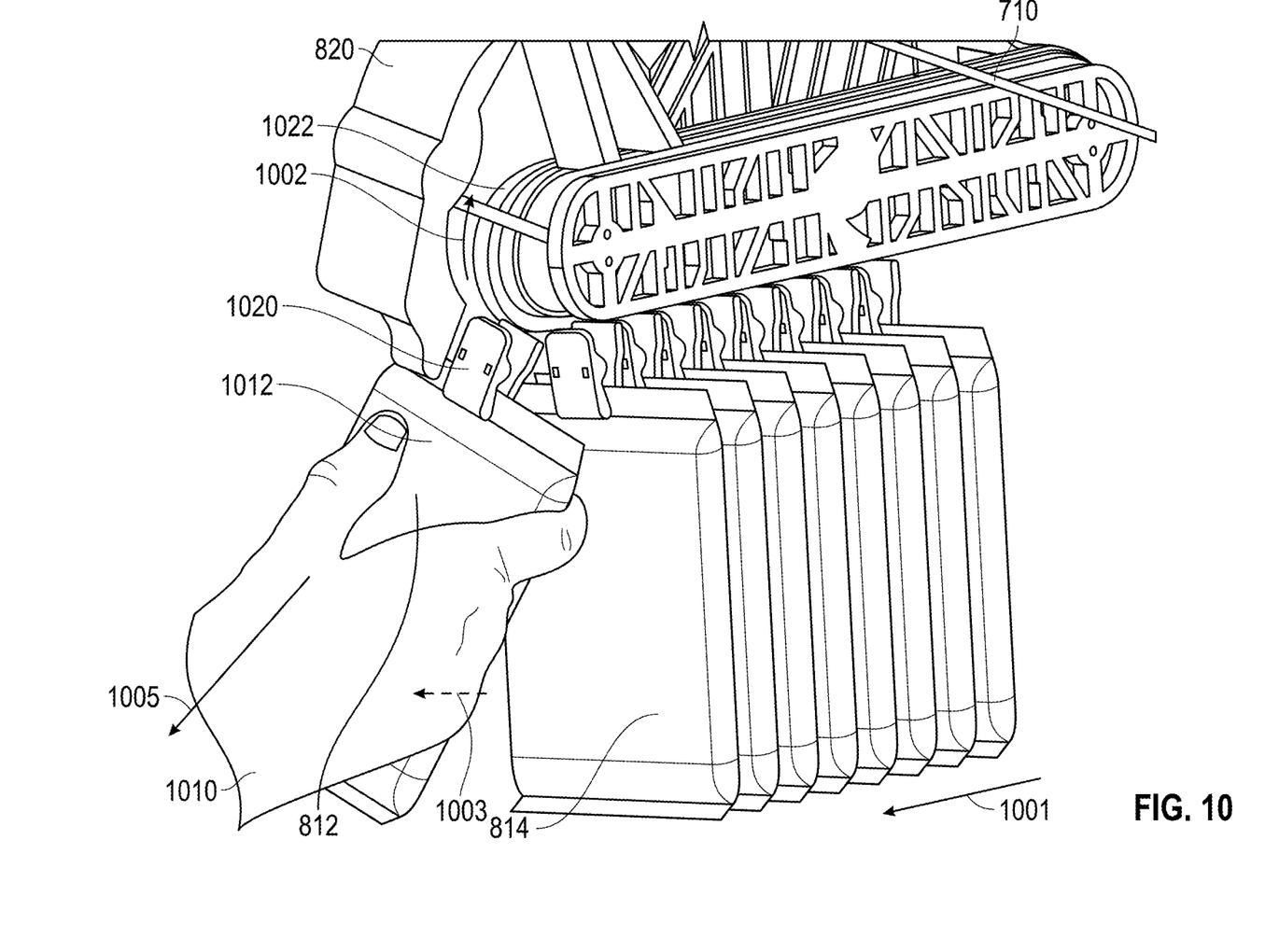
FIG. 10 is an example of the merchandise display devices of FIG. 1 dispensing a product and bringing the next product to a same front position as the dispensed product.

The merchandise display devices 100 may display and store a number of products 810. In each of the number of merchandise display devices 110 as shown in the embodiment of FIG. 8, a front piece of product 812 may be aligned with other front pieces to form a product display appearance. A second piece of product 814 behind the front piece of product 812 can be moved forward to the product display position when a front piece of product 812 is pulled and removed by a customer. An example is illustrated in FIG. 10. In some embodiments, the merchandise system including the multiple merchandise display devices 100 may be refrigerated or placed within a refrigerated area. For example, the racks 710 to be installed onto a back wall of the refrigerator or within a walk-in cooler at a store.

Figure 9:
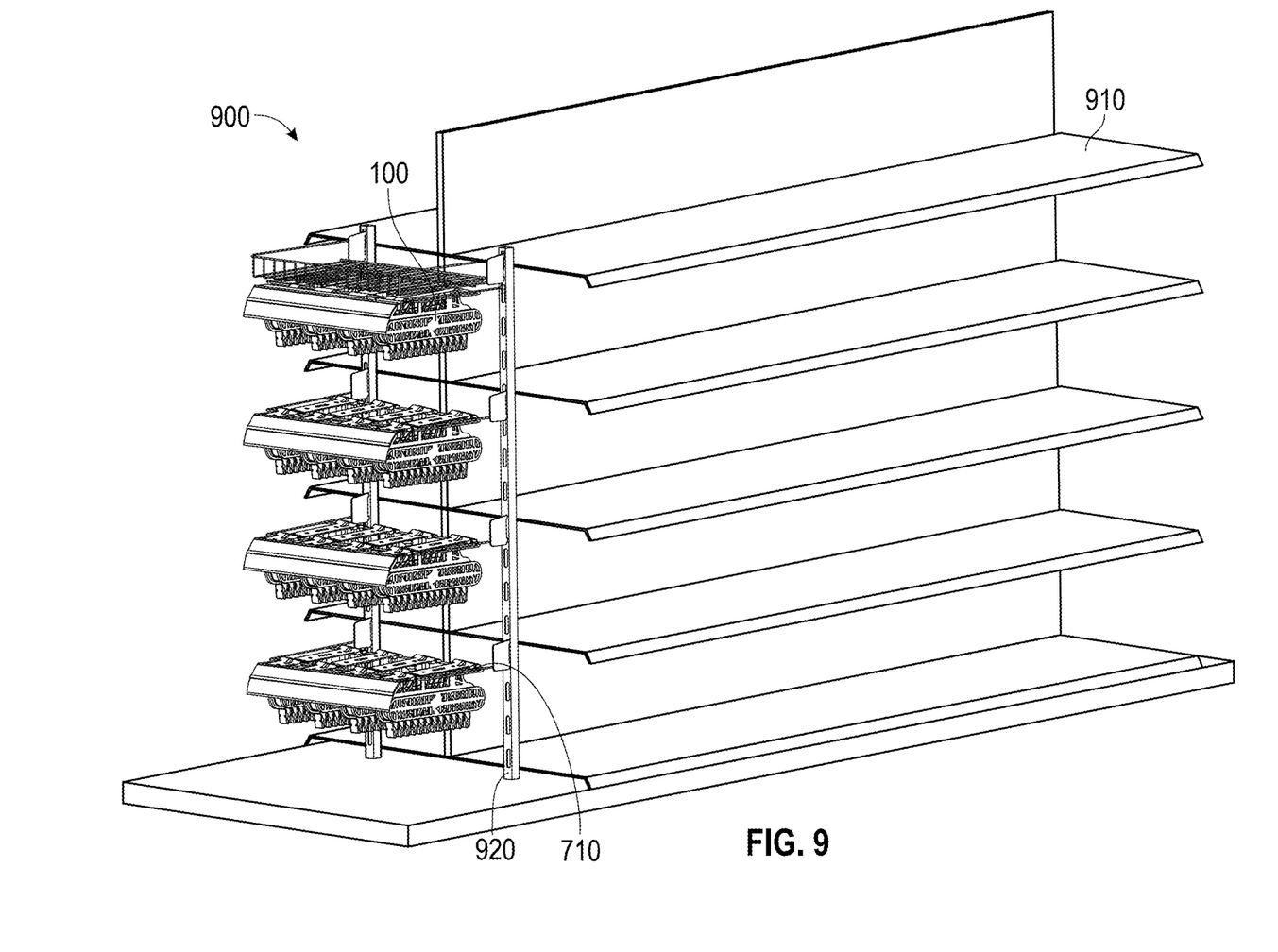
FIG. 9 is an example configuration of the multiple merchandise display devices of FIG. 7 as an end cap and installed with other shelves and display structures.

FIG. 9 is an example merchandising station 900 positioned as an end cap and having multiple merchandise display devices 100 of FIG. 7 installed on four shelves or display structures. As shown, the merchandising station 900 includes the multiple merchandise display devices 100 assembled together with or positioned adjacent shelves 910. The merchandise display devices 100 secured onto racks 710 may be supported by vertical posts 920, and may be adjustable in different vertical locations of the vertical posts 920. Although only four levels or stories of the racks 710 are illustrated, other configurations or arrangements depending on the product heights are possible.

FIG. 10 is an example of the merchandise display device 100 of FIG. 1 dispensing a product 812 and bringing the next product to a same front position as the dispensed product. When a customer 1010 applies a pulling force 1005 to the front piece of product 812 in the direction 1003, the pulling force 1005 moves the conveyor belt 112 and other products in the direction 1001. The conveyor belt 112 rotates clockwise in the direction 1002. The clip 1020 holding the first piece of product 812 is moved toward the information display 820 (which may be an example of the information display 800 of FIG. 8) and causes the previous emptied clip 1022 to move behind the information display 820. In some embodiments, the customer 1010 may hold onto the product 812 and a position 1012 close to the clip 1020. FIG. 10 may also provide an illustration of loading the display device 100 with products or merchandise if all shown forces and directions are provided in opposite directions. For example, customer 1010 may be employee 1010 that is adding each piece of merchandise to a clip, such as the clip 1020, and then rotating the conveyor belt 112 in a counterclockwise direction through application of a force in the opposite direction as 1001 until all or a desired number of the clips have been supplied with pieces of merchandise as shown.

Figure 11:
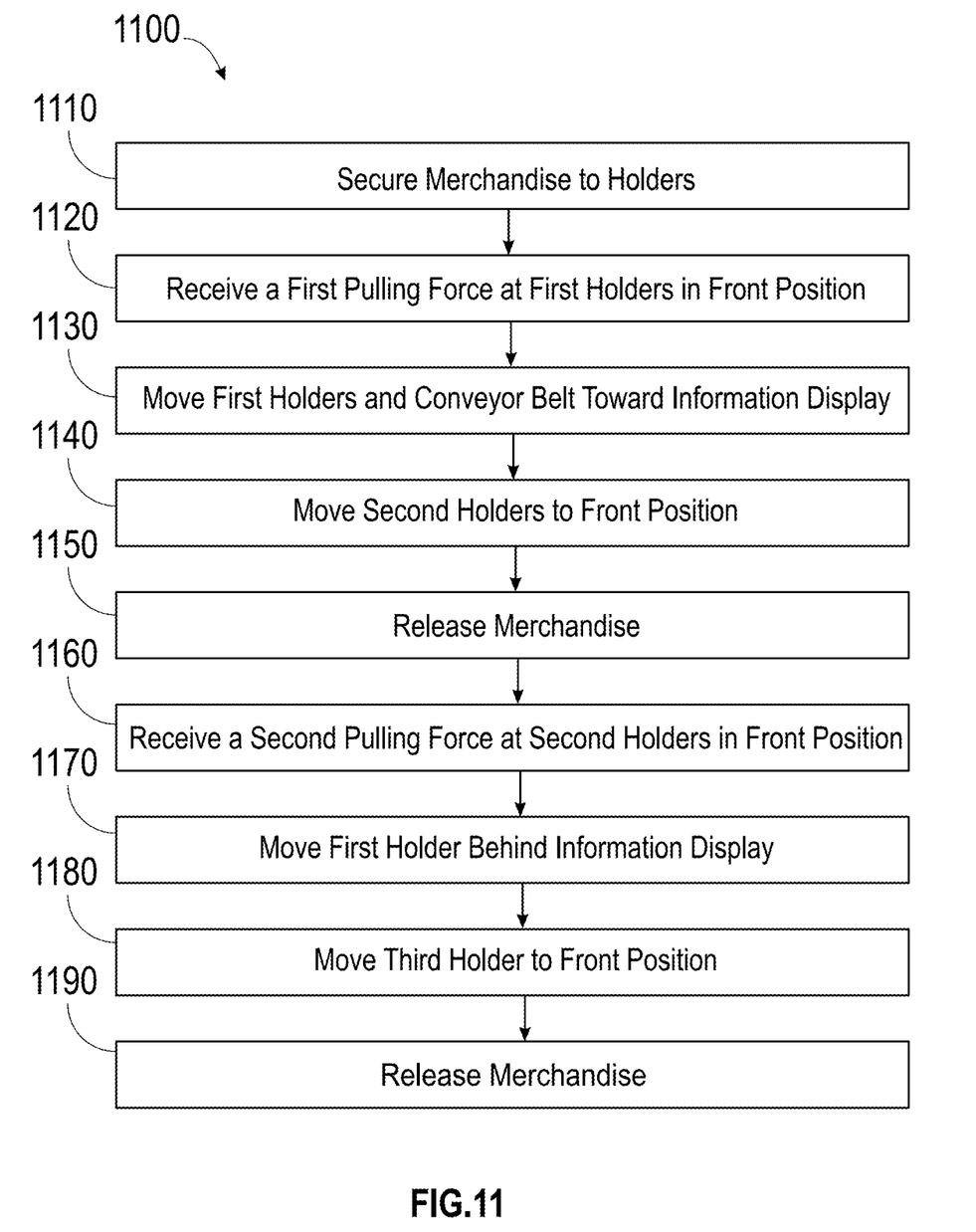
FIG. 11 is a flow chart of a method for dispensing products using the merchandise display device disclosed herein.

FIG. 11 is a flow chart of a method 1100 for dispensing products using the merchandise display device disclosed herein. At block 1110, a number of pieces of merchandise are secured to a number of holders secured to a conveyor belt. At block 1120, a pulling force is received at a first piece of merchandise that is secured to a first holder secured to a conveyor belt. At 1130, the first holder of the plurality of holders secured to the conveyor belt is moved upwards in response to receiving the pulling force. At 1140, in response to the pulling force, a second holder positioned behind the first holder of the plurality of holders secured to the conveyor belt is moved to a position where the first holder was previously positioned. The second holder secures a second piece of merchandise. At 1150, the first piece of merchandise of the plurality of pieces of merchandise is released in response to a sufficient amount of pulling force. In certain implementations, the first holder may also be positioned behind an information display in response to moving the first holder upwards in response to the pulling force.

At block 1160, a second pulling force is received at the second piece of merchandise secured to the second holder of the plurality of holders secured to the conveyor belt. The second holder of the plurality of holders secured to the conveyor belt is moved upwards in response to receiving the second pulling force. At block 1170, in one embodiment or implementation, the first holder is moved behind the information display in response to the movement caused by the second pulling force. At block 1180, the first holder (now emptied and positioned before the second holder) is moved behind an information display in response to the movement of the conveyor belt caused by the second pulling force. A third holder positioned behind the second holder is also moved to a position where the second holder was previously positioned. The third holder secures a third piece of merchandise of the plurality of pieces of merchandise. At block 1190, the second piece of merchandise of the plurality of pieces of merchandise is released in response to the second pulling force.

In some embodiments, the method 1100 further includes counting a number of emptied holders secured to the conveyor belt for inventory purposes. In some other embodiments, the method further includes counting a number of holders secured to the conveyor belt that still contain merchandise for inventory purposes.

In some implementations, releasing a front piece of the merchandise further comprises moving a next piece to a position occupied by the front piece before receiving the pulling force at the next piece of the merchandise as a result of a rotation of the conveyor belt. For example, when a front piece of the merchandise is pulled away from its holder, the method includes using a motorized or mechanically biased conveyor belt to move the next piece of the merchandise to the previous position of the front piece of the merchandise before pulled away.

In some embodiments, the method 1100 further includes counting a number of holders having released a piece of the plurality pieces of the merchandise and reporting the number to an accounting processor for accounting. In some other embodiments, counting the number of holders having released a piece of the plurality pieces of the merchandise includes counting a number of emptied holders moved behind the information display.

The method 1100 may further include displaying a digital image or video clip at the information display. For example, the information display may include LCD panels for updating and showing pre-programmed product information. In some embodiments, the information display may be connected to an internet server and receive updated information on what digital image or video clip to display. This could include information about the product, pricing, sales, and even discounts at certain times of the day or designated times.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, embodiments or implementations described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A device for displaying and storing merchandise, the device comprising:
   a conveyor belt;
   two or more holders positioned adjacent the conveyor belt, the two or more holders provide direct support for merchandise engaged thereon;
   a front roller adjacent a front end of the device and in a rotational coupling arrangement with the conveyor belt such that the conveyor belt is at least partially supported by and wraps around the front roller;
   a back roller in a rotational coupling arrangement with the conveyor belt such that the conveyor belt is at least partially supported by and wraps around the back roller, the back roller and the front roller positioned between a product access side of the device and a hidden side of the device; and
   a frame arranged to provide a distance between the front roller and the back roller, the frame at least partially covering the hidden side of the device such that at least one of the two or more holders positioned on the hidden side of the device is not directly accessible,
   wherein the two or more holders positioned adjacent the conveyor belt are configured to move with the conveyor belt around the front roller and the back roller when the conveyor belt moves with the front roller and the back roller, and wherein movement of one of the two or more holders in a first direction causes the conveyor belt to move with the front roller and the back roller to move the two or more holders, and wherein at least one of the two or more holders is accessible to receive a force causing movement of the conveyor belt when the at least one of the two or more holders is positioned on the product access side of the device.

2. The device of claim 1, wherein the conveyor belt includes a plurality of inward facing protrusions and the front roller includes a gear having outward facing teeth engageable with the plurality of inward facing protrusions of the conveyor belt.

3. The device of claim 2, wherein the back roller includes another gear having outward facing teeth engageable with the plurality of inward facing protrusions of the conveyor belt such that the front roller and the back roller provide a tension to the conveyor belt to reduce the conveyor belt slack.

4. The device of claim 2, wherein the plurality of inward facing protrusions of the conveyor belt includes receiving holes for receiving and securing the two or more holders therein.

5. The device of claim 1, wherein the frame includes a first half and a second half, the first half including a first axis support to receive the front roller, a second axis support to receive the back roller, a guide rail for guiding the two or more holders, and a hanger for hanging the frame onto an external member.

6. The device of claim 5, wherein the hanger includes a channeled ceiling comprising a channel therein, the channel insertable onto the external member which includes a rod portion.

7. The device of claim 1, further comprising a sensor for measuring a movement of the two or more holders, the movement indicative of a number of the two or more holders moved from the product access side of the device toward the hidden side of the device.

8. The device of claim 1, wherein the two or more holders include one or more of a clip, a hook, a hanger, a magnetic surface, a horseshoe shaped support, clasp, angled bar, an open clip arranged to be placed in an open position when a stored merchandise is removed from the open clip, and an adhesive surface.

9. The device of claim 1, wherein the conveyor belt includes a plurality of square holes and the two or more holders include corresponding handles insertable into the plurality of square holes.

10. The device of claim 1, wherein the conveyor belt is a chain.

11. The device of claim 1, wherein the conveyor belt may move in the first direction and in a second direction, the second direction being opposite to the first direction.

12. A method for displaying and dispensing merchandise, the method comprising:

securing a plurality of pieces of merchandise to a plurality of holders secured to a conveyor belt, the plurality of holders directly supporting the plurality of pieces of merchandise, and the conveyor belt supported by a frame, and the frame defining a product access side and a hidden side, the product access side exposing at least at least one of the plurality of holders;

receiving a pulling force at a first piece of merchandise of the plurality of pieces of merchandise that is secured to a first holder of the plurality of holders secured to the conveyor belt, the first holder positioned on the product access side of the frame; and moving the first holder of the plurality of holders secured to the conveyor belt upwards toward the hidden side of the frame in response to receiving the pulling force and releasing the first piece of merchandise of the plurality of pieces of merchandise, and wherein, in response, a second holder of the plurality of holders positioned behind the first holder of the plurality of holders secured to the conveyor belt is moved to a position at or adjacent where the first holder was previously positioned; and wherein the second holder secures a second piece of merchandise.

13. The method of claim 12, further comprising:

receiving a second pulling force at the second piece of merchandise of the plurality of pieces of merchandise that is secured to the second holder of the plurality of holders secured to the conveyor belt; and moving the second holder of the plurality of holders secured to the conveyor belt upwards in response to receiving the second pulling force and releasing the second piece of merchandise of the plurality of pieces of merchandise, wherein, in response, the first holder of the plurality of holders secured to the conveyor belt is moved behind an information display, and a third holder of the plurality of holders positioned behind the second holder of the plurality of holders secured to the conveyor belt is moved to a position at or adjacent where the second holder was previously positioned; the third holder securing a third piece of merchandise of the plurality of pieces of merchandise.

14. The method of claim 13, further comprising counting a number of emptied holders of the plurality of holders secured to the conveyor belt for inventory purposes.

15. The method of claim 13, further comprising counting a number of holders of the plurality of holders secured to the conveyor belt that still contain merchandise for inventory purposes.

16. The method of claim 13, wherein releasing a front piece of the plurality pieces of the merchandise further comprises moving a next piece of the plurality pieces of the merchandise to a position occupied by the front piece of the plurality pieces of the merchandise before receiving the pulling force at the next piece of the plurality pieces of the merchandise as a result of a rotation of the conveyor belt.

17. The method of claim 13, further comprising counting a number of holders having released a piece of the plurality pieces of the merchandise and reporting the number to an accounting processor for accounting.

18. The method of claim 13, further comprising displaying a digital image or video clip at the information display.

19. The method of claim 13, wherein moving the first holder of the plurality of holders secured to the conveyor belt upwards in response to receiving the pulling force further includes moving the first holder of the plurality of holders secured to the conveyor belt behind an information display.

20. A system for displaying and storing merchandise, the system comprising:

one or more racks structured and arranged to mount one or more merchandise display devices, the one or more merchandise display devices comprising:

a conveyor belt;

one or more holders positioned adjacent the conveyor belt, wherein the one or more holders are configured to engage a piece of merchandise and support the piece of merchandise;

a front roller adjacent a front end of the device and in a rotational coupling arrangement with the conveyor belt such that the conveyor belt is at least partially supported by and wraps around the front roller;

a back roller in a rotational coupling arrangement with the conveyor belt such that the conveyor belt is at least partially supported by and wraps around the back roller; and a frame arranged to provide a distance between the front roller and the back roller, wherein the back roller and the front roller positioned between a product access side of the frame and a hidden side of the frame, the frame at least partially covering the hidden side such that one or more of the two or more holders positioned on the hidden side of the frame is not directly accessible, wherein the one or more holders positioned adjacent the conveyor belt move when the conveyor belt moves with the front roller and the back roller, and wherein movement of any of the one or more holders in a first direction causes the conveyor belt to move with the front roller and the back roller to move all the one or more holders, wherein at least one of the two or more holders is accessible to receive a force causing movement of the conveyor belt when the at least one of the two or more holders is positioned on the product access side of the frame; and one or more information displays positioned adjacent the front end of at least one of the one or more merchandise display devices, wherein the one or more information displays and the frame substantially hides the hidden side of the frame and holders positioned thereon.

21. The system of claim 20, wherein a holder of the one or more holders releases the piece of merchandise being held by the holder when the piece of merchandise receives a pulling force away from the holder.

22. The system of claim 21, wherein an emptied one of the one or more holders positioned before a loaded one of the one or more holders holding a piece of merchandise is moved behind the one or more information displays when the loaded one of the one or more holders receives a pulling force towards the one or more information displays, and releases the piece of merchandise.

23. The system of claim 22, wherein the one or more holders have a full length and are hinged and configured to allow the one or more holders to rotate relative to the conveyor belt such that a clearance height for holders moved behind the one or more information displays is less than the full length of one of the one or more holders.

24. The system of claim 20, wherein the frame is arranged to allow one or more of the front roller and the back roller to be space apart at different distances for use with conveyor belts of different lengths, such that a different number of holders may be installed on the conveyor belts of different lengths.

25. The system of claim 20, wherein the one or more merchandise display devices further comprises a hanger bracket for engaging the one or more racks, the hanger bracket including a slot having an opening less than a diameter of a metal bar of the one or more racks, the slot receiving the metal bar by a friction fitting.

* * * * *